United States Patent
Ferguson et al.

(10) Patent No.: US 7,322,744 B2
(45) Date of Patent: Jan. 29, 2008

(54) TEMPERATURE MEASUREMENT DEVICE

(75) Inventors: Walter J. Ferguson, Waterbury, CT (US); John H. Bailey, Shelton, CT (US)

(73) Assignee: Ashcroft, Inc., Stratford, CT (US)

( * ) Notice: Subject to any disclaimer, the term of this patent is extended or adjusted under 35 U.S.C. 154(b) by 0 days.

(21) Appl. No.: 11/305,373

(22) Filed: Dec. 16, 2005

(65) Prior Publication Data

US 2006/0098712 A1     May 11, 2006

Related U.S. Application Data

(60) Division of application No. 10/647,926, filed on Aug. 26, 2003, now Pat. No. 6,986,602, which is a continuation-in-part of application No. 10/400,330, filed on Mar. 27, 2003, now Pat. No. 7,165,461.

(51) Int. Cl.
*G01K 5/36* (2006.01)
*G01K 1/02* (2006.01)
*G01K 7/36* (2006.01)

(52) U.S. Cl. ............... 374/195; 374/205; 374/208; 374/163; 374/187

(58) Field of Classification Search ........... 374/120, 374/121, 163, 195, 208, 205, 117, 187, 188, 374/203, 184; 324/207.7, 760
See application file for complete search history.

(56) References Cited

U.S. PATENT DOCUMENTS

| | | | |
|---|---|---|---|
| 1,879,276 A | 9/1932 | Archibald | 374/152 |
| 1,953,914 A | 4/1934 | Camilli | 374/152 |
| 2,117,287 A | 5/1938 | Bloch | 374/187 |
| 2,372,582 A | 3/1945 | Kean | 367/82 |
| 2,437,085 A * | 3/1948 | Evans | 374/184 |
| 2,457,286 A | 12/1948 | Tollefsen et al. | 116/293 |
| 3,235,690 A * | 2/1966 | Gryctko | 337/106 |
| 3,283,581 A | 11/1966 | Du Bois et al. | |
| 3,459,043 A | 8/1969 | Young | 374/188 |
| 3,581,566 A | 6/1971 | Goff et al. | |
| 3,615,719 A * | 10/1971 | Michel et al. | 426/88 |
| 3,742,233 A | 6/1973 | Gorgens et al. | |
| 3,865,557 A | 2/1975 | Andres et al. | 428/642 |

(Continued)

FOREIGN PATENT DOCUMENTS

DE     2341988 A     3/1975

(Continued)

OTHER PUBLICATIONS

EPO, Patent Abstracts of Japan, Electromagnetic Induction Type Position Detector, vol. 2000, No. 26 Jul. 1, 2002, JP 2001 255107 A (Mitsutoyo Corp), Sep. 21, 2001 Abstract, pp. 1.

(Continued)

*Primary Examiner*—Gail Verbitsky
(74) *Attorney, Agent, or Firm*—McCarter & English, LLP (57) ABSTRACT

A temperature measuring device includes a temperature-responsive element that mechanically moves a first inductive assembly component relative to a second inductive assembly component in response to temperature changes. The movement of the first inductive assembly component relative to the second inductive assembly component generates a change in a local eddy current pattern that corresponds to the sensed temperature.

17 Claims, 5 Drawing Sheets

U.S. PATENT DOCUMENTS

| | | | |
|---|---|---|---|
| 3,867,689 A * | 2/1975 | Mori et al. | 324/234 |
| 3,878,721 A | 4/1975 | Nath | 374/154 |
| 3,936,734 A * | 2/1976 | Brandli et al. | 324/243 |
| 3,946,307 A * | 3/1976 | Mori et al. | 324/234 |
| 3,973,191 A | 8/1976 | Zabler | 324/207.16 |
| 3,975,706 A | 8/1976 | Kato | 340/454 |
| 4,055,085 A | 10/1977 | Wetterhorn | |
| 4,075,551 A | 2/1978 | Zabler | 324/207.16 |
| 4,095,469 A * | 6/1978 | Yamada et al. | 374/120 |
| 4,099,414 A | 7/1978 | Krahmer | 374/192 |
| 4,184,377 A | 1/1980 | Hubbard | |
| 4,237,445 A | 12/1980 | Crossman | |
| 4,357,114 A * | 11/1982 | Iwasaki | 374/176 |
| 4,396,301 A | 8/1983 | Stucki | |
| 4,460,869 A * | 7/1984 | Buser et al. | 324/200 |
| 4,502,334 A | 3/1985 | Gorgens et al. | |
| 4,598,260 A | 7/1986 | Carr | |
| 4,643,586 A | 2/1987 | Hansen | 374/1 |
| 4,671,116 A | 6/1987 | Glennon et al. | |
| 4,745,811 A | 5/1988 | Gray | |
| 4,833,919 A | 5/1989 | Saito et al. | 73/313 |
| 5,022,425 A | 6/1991 | Prescott et al. | |
| 5,070,736 A * | 12/1991 | Lew | 73/736 |
| 5,243,860 A | 9/1993 | Habart | 73/291 |
| 5,255,981 A * | 10/1993 | Schiessle et al. | 374/163 |
| 5,257,639 A | 11/1993 | Prescott et al. | |
| 5,322,119 A | 6/1994 | Kadwell et al. | |
| 5,521,494 A | 5/1996 | Hore et al. | 324/207.16 |
| 5,693,875 A * | 12/1997 | Cremer | 73/1.71 |
| 5,742,161 A | 4/1998 | Karte | 324/207.16 |
| 5,806,761 A | 9/1998 | Enoki et al. | 236/12.2 |
| 5,829,148 A | 11/1998 | Eaton | |
| 5,944,179 A | 8/1999 | Walker | |
| 5,971,072 A * | 10/1999 | Huber et al. | 166/297 |
| 5,973,267 A | 10/1999 | Huang | |
| 5,994,895 A | 11/1999 | Bolte et al. | 324/207.16 |
| 6,051,293 A | 4/2000 | Weilandt | |
| H001854 H | 7/2000 | Boston et al. | 324/207.15 |
| 6,114,849 A | 9/2000 | Price et al. | 324/240 |
| 6,119,525 A | 9/2000 | Hamma | |
| 6,164,138 A | 12/2000 | Blake et al. | |
| 6,216,541 B1 | 4/2001 | Carpenter | |
| 6,295,876 B1 | 10/2001 | Busch | |
| 6,369,715 B2 | 4/2002 | Bennett, Jr. et al. | |
| 6,384,596 B1 | 5/2002 | Beyer | |
| 6,422,746 B1 | 7/2002 | Weiss et al. | 374/156 |
| 6,523,427 B1 | 2/2003 | Ferguson | |
| 6,530,281 B2 | 3/2003 | Chou | |
| 6,604,057 B1 | 8/2003 | Eden et al. | 702/104 |
| 6,636,793 B2 | 10/2003 | Garber et al. | |
| 6,637,272 B1 | 10/2003 | Bariere | |
| 6,742,396 B2 | 6/2004 | Schenk, Jr. | |
| 6,812,693 B2 | 11/2004 | Heinrich et al. | 324/207.15 |
| 6,986,602 B2 * | 1/2006 | Ferguson et al. | 374/195 |
| 7,165,461 B2 * | 1/2007 | Ferguson | 73/732 |
| 2001/0045892 A1 | 11/2001 | Thomas et al. | |
| 2002/0079726 A1 | 6/2002 | Garber et al. | |
| 2003/0020466 A1 | 1/2003 | Lewis | |
| 2004/0119459 A1 | 6/2004 | Komura | 324/146 |
| 2004/0129095 A1 | 7/2004 | Churchill et al. | 73/866.5 |
| 2005/0093537 A1 | 5/2005 | Townsend et al. | 324/207.18 |
| 2005/0104578 A1 | 5/2005 | Weber | 324/207.15 |
| 2006/0056488 A1 * | 3/2006 | Surname et al. | 374/184 |

FOREIGN PATENT DOCUMENTS

| | | |
|---|---|---|
| DE | 2739054 A | 3/1979 |
| FR | 2.192.704 | 2/1974 |
| FR | 2.284.869 | 6/1976 |
| GB | 1310030 | 3/1973 |
| GB | 1451899 | 10/1976 |
| GB | 2220270 A | 1/1990 |
| GB | 2345546 | 7/2000 |
| JP | 60093325 A | 5/1985 |
| JP | 60138430 A * | 7/1985 |
| JP | 02025721 A | 1/1990 |
| JP | 020252721 A * | 1/1990 |
| JP | 2000162913 A | 6/2000 |
| JP | 2000193531 A * | 7/2000 |
| SU | 494623 A | 3/1976 |
| SU | 1104406 A * | 7/1984 |
| WO | WO 2004/053450 A1 | 6/2004 |

OTHER PUBLICATIONS

PCT International Search Report, PCT/US2004/004484, Jul. 2004, pp. 1-4.

PCT International Search Report, PCT/US2004/004543, Jul. 2004, pp. 1-4.

PCT International Search Report, PCT/US03/38041, May 2004, pp. 1-4.

Accutech, Wireless Instrumentation, Pressure Field Unit, 2 pages, 2003.

Accutech, Wireless Instrumentation, Base Radio, 2 pages, 2003.

Innovative Sensor Solutions, LTD., DataStik Wireless Tank Gauging, Proven Magnetostrictive Level Sensing Performance: Now Wireless and Battery-Powered, 2 pages.

EPO, Patent Abstracts of Japan, Information Control Device for Diving Work, vol. 016, No. 169 (M-1239, Apr. 23, 1992, JP 04 015191 A (UEDA Nippon Musen KK), Jan. 20, 1992, Abstract, pp. 1.

* cited by examiner

TEMPERATURE MEASUREMENT DEVICE

RELATED APPLICATIONS

This application is a divisional of U.S. patent application Ser. No. 10/647,926, entitled "Temperature Measurement Device" and filed on Aug. 26, 2003, now U.S. Pat. No. 6,986,602, which is a continuation-in-part of U.S. patent application Ser. No. 10/400,330, entitled "Pressure Gauge Having Dual Function Movement Plate" and filed on Mar. 27, 2003 now U.S. Pat. No. 7,165,461.

TECHNICAL FIELD

This description relates to temperature measurement, and, in particular, to temperature measurement devices.

BACKGROUND

Temperature measurement gauges are commonly found in many commercial and industrial applications. Such devices typically may use bimetallic coils or gas-filled Bourdon tubes to sense temperature and drive a shaft connected to a pointer. The pointer is disposed opposite a dial having temperature indicia thereon. Thus, a technician may read the temperature at the gauge.

Furthermore, a variety of devices need temperature measurement for proper operation. For example, many volumetric gas flow meters require temperature to properly register the amount of gas passing therethrough. Such devices often use mechanical techniques to perform the temperature compensation.

SUMMARY

In one general aspect, a device for measuring temperature includes a housing, a temperature-responsive element, and an inductive assembly. The temperature-responsive element is supported relative to the housing and is operable to sense temperature and to move in response to temperature changes. A first inductive assembly component is fixed relative to the housing, and a second inductive assembly component is operatively and movably positioned relative to the first inductive assembly component. The second inductive assembly component is driven by movement of the temperature-responsive element, and the movement of the second inductive assembly component relative to the first inductive assembly component generates a change in a local eddy current pattern corresponding to the sensed temperature. In particular implementations, a current at a particular point in a sensing circuit is proportional to the temperature changes causing the temperature-responsive element to move.

Certain implementations may include a circuit board including the first inductive assembly component. The circuit board may include a processor responsive to generated eddy current patterns to generate a signal representative of sensed temperature. In generating the signal, the processor may determine the movement of the temperature-responsive element based on the generated eddy current patterns and associate the movement with a temperature to generate the signal.

In particular implementations, the temperature-responsive element includes a first portion generally fixed relative to the housing and a second portion displaceable relative to the first portion, wherein the second portion drives the second inductive assembly component. The device may also include a visual indicator movably positioned relative to the housing and driven by the second portion of the temperature-responsive element to indicate temperature.

In some implementations, the second inductive assembly component includes a gear with a pitch ratio larger than that of the temperature-responsive element. The gear may include a protuberance that operates as an inductive target in the inductive assembly.

In another general aspect, a device for measuring temperature includes a coil operable to displace in response to changes in temperature of a medium for which a temperature is to be sensed and a rotatable shaft driven by the temperature-responsive coil. The device also includes an inductive target displaceable by the rotatable shaft and an inductor positioned relative to the inductive target such that displacement of the inductive target by the rotatable shaft generates a change in a local eddy current pattern corresponding to the temperature to be sensed. The inductive target may be rotatable with the rotatable shaft and may include a plurality of radial features extending transversely relative to a longitudinal axis of the rotatable shaft. The coil may be a bimetallic coil including a proximal end driving the rotatable shaft.

Certain implementations may include a circuit board including an opening through which the rotatable shaft extends, wherein the circuit board includes the inductor. Additionally, the inductive target may rotate in a plane generally parallel to the circuit board.

Particular implementations include a pointer coupled to the rotatable shaft and an indicia plate fixed relative to the pointer such that the pointer rotates in a plane generally parallel to the indicia plate to indicate temperature. The inductive target may be positioned between the indicia plate and a circuit board.

Some implementations may include a microprocessor responsive to generated eddy current patterns to generate a signal representative of sensed temperature. The microprocessor may determine the movement of the shaft based on generated eddy current patterns and associate the movement with a temperature to generate the signal.

In certain implementations, the inductive target includes a gear with a pitch ratio larger than that of the rotatable shaft. The gear may include a protuberance that operates as the inductive target. The pitch ratio of the gear may be approximately fifteen times larger than that of the rotatable shaft.

In another general aspect, temperature measurement may be facilitated by a process performed at a temperature measurement device. The process may include sensing a temperature change, converting the sensed temperature change to mechanical movement, and converting the mechanical movement to an electrical signal representing the movement by induction. The process may also include detecting the electrical signal and determining the mechanical movement based on the electrical signal.

In particular implementations, converting the sensed temperature change to mechanical movement may include rotating a shaft in response to the sensed temperature change.

In some implementations, converting the mechanical movement to an electrical signal representing the movement by induction includes moving an inductive target relative to an inductor, the movement generating a change in an eddy current pattern. In certain implementations, moving an inductive target includes driving the target with a gear that has a pitch ratio less than that of the inductive target.

Particular implementations may include determining a temperature associated with the mechanical movement. Additionally, these implementations may include generating a signal representing the temperature. Determining a temperature associated with the mechanical movement may include determining the amount of mechanical movement.

In another general aspect, a device for measuring temperature includes a transducer, an inductive target, a circuit board, and a visual indicator. The transducer includes a temperature-responsive, bimetallic coil and a rotatable shaft. The coil is positioned to displace in response to changes in temperature of a medium for which a temperature is to be sensed. The rotatable shaft is coupled to a second end of the coil and is driven by the coil. The inductive target is coupled to the shaft and rotated thereby. The target includes a plurality of radial features extending transversely relative to a longitudinal axis of the rotatable shaft. The circuit board includes an opening through which the rotatable shaft extends and an inductor positioned relative to the inductive target such that rotation of the inductive target by the shaft generates a change in the local eddy current pattern representing the shaft rotation. The circuit board also includes a microprocessor responsive to generated eddy current patterns to determine the rotation of the shaft, to associate the rotation with a temperature, and to generate an electrical signal representative of sensed temperature. The visual indicator includes an indicia plate generally parallel to the circuit board and a pointer fixed to the rotatable shaft relative to the indicia plate to indicate temperature, wherein the inductive target is positioned between the indicia plate and the circuit board and the pointer rotates in a plane generally parallel to the indicia plate.

Details of one or more implementations are set forth in the accompanying drawings and the description below. Other features and advantages may be apparent from the description and drawings, and from the claims.

The drawing figures are not necessarily to scale, and, in certain views, parts may have been exaggerated for purposes of clarity.

DETAILED DESCRIPTION

Temperature measurement devices include devices operable to sense a temperature to be measured, convert the temperature to a mechanical movement, convert the mechanical movement to an electrical signal, and detect the electrical signal, where the electrical signal represents the sensed temperature. Thus, temperature measurement devices may produce electrical signals that represent temperature. Other temperature measurement devices, however, may have a variety of other features.

Figure 1A:
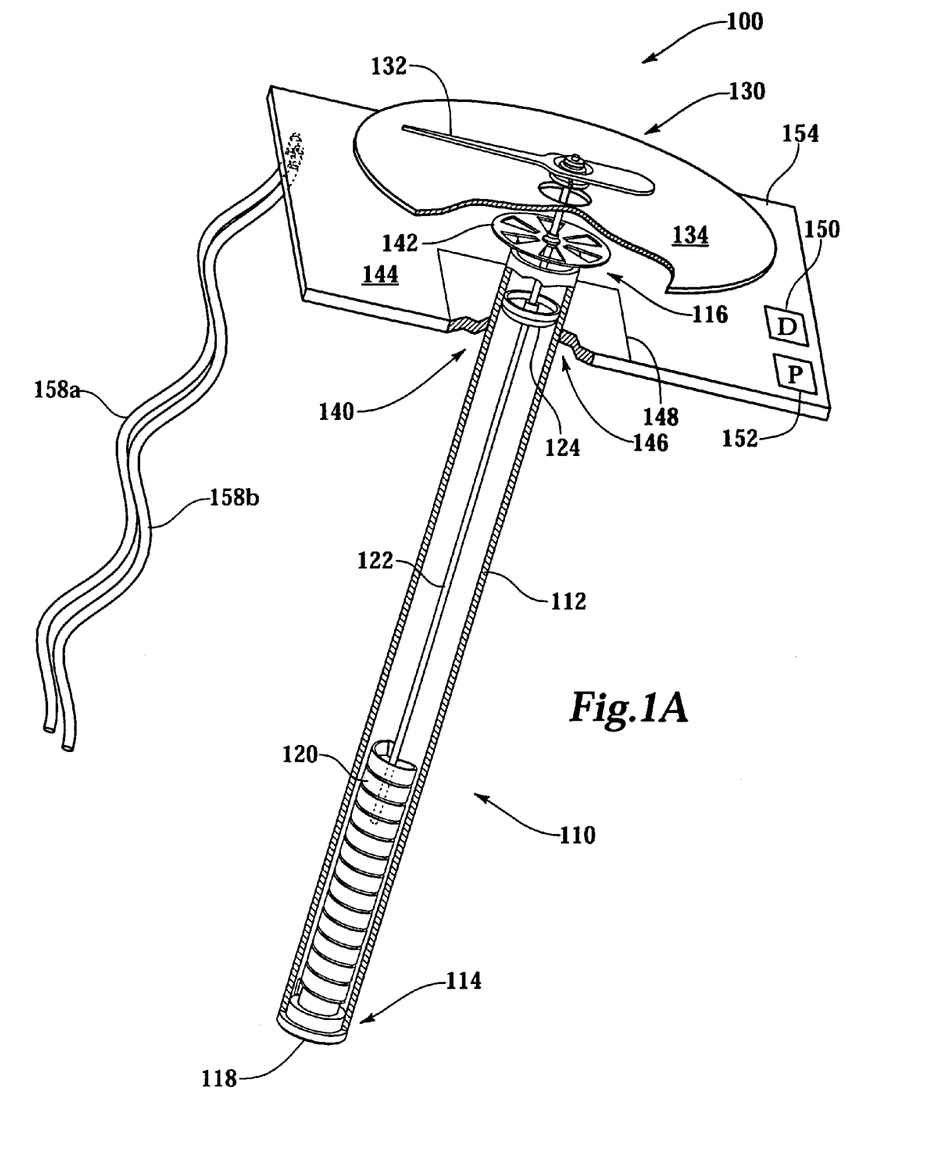
FIGS. 1A-B illustrate an example temperature measurement device.
Figures 1B, 2:
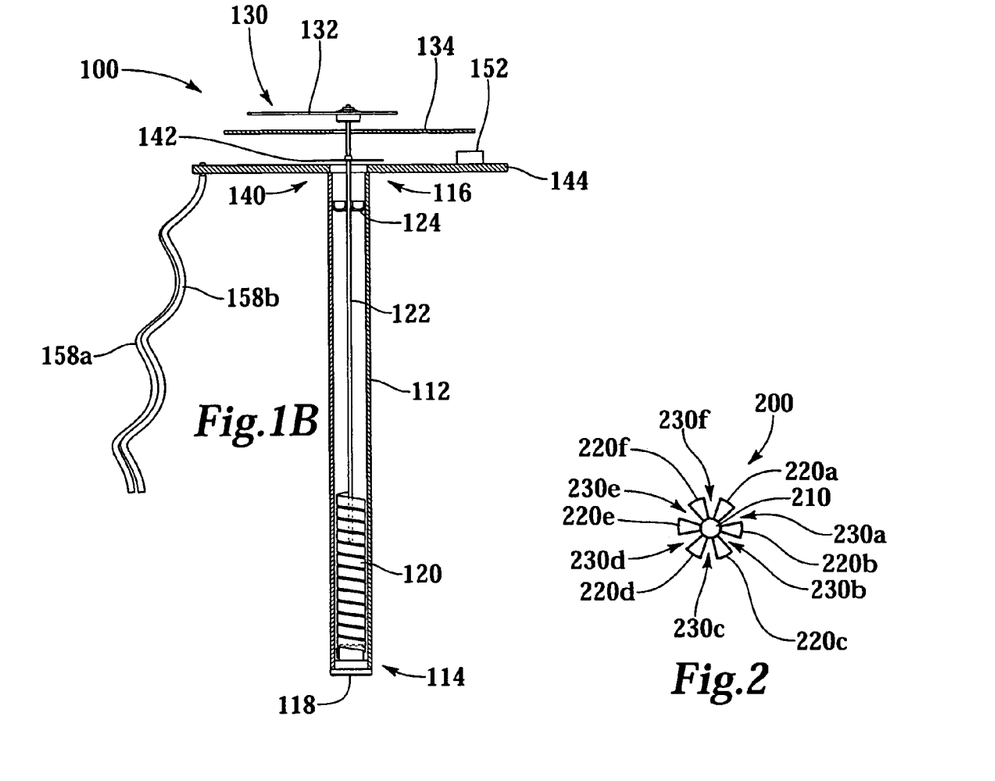
FIG. 2 shows a top view an example inductive target.

FIGS. 1A-B illustrate an example temperature measurement device 100. A sectioned, perspective view of device 100 is shown in FIG. 1A, and a sectioned, side elevated view of device 100 is shown in FIG. 1B.

Device 100 includes a temperature-responsive assembly 110, a visual indicator assembly 130, and a movement-indicative signal generator 140. In operation, temperature-responsive assembly 110 generates mechanical movement in response to temperature changes. Based on this movement, visual indicator assembly 130 provides a visual indication of the temperature, and signal generator 140 produces an electrical signal representing the movement. Because the electrical signal represents the movement, and the movement is produced by the sensed temperature, the electrical signal corresponds to the sensed temperature.

In more detail, temperature-responsive assembly 110 includes an elongated housing 112 having a first end 114 and a second end 116. At first end 114, assembly 110 includes a stepped-down-diameter plug 118 that is coupled (e.g., by welding) to one end of a bimetallic, spiral-wound coil 120. Plug 118 may also be sealingly engaged (e.g., by welding) with housing 112. At its other end, coil 120 is coupled (e.g., by welding) to a rotatable shaft 122. Coil 120 displaces in response to temperature changes near first end 114 and causes shaft 122 to rotate, a type of mechanical movement. Thus, coil 120 is a transducer that converts temperature to mechanical movement. The medium for which coil 120 is sensing temperature may be a solid, a liquid, or a gas.

Assembly 110 also includes a guide 124 that secures shaft 122. As a multitude of transducer lengths are commonly seen in various applications, guide 124 may include multiple components properly spaced to minimize drag on shaft 122.

Visual indicator assembly 130 includes a pointer 132 and a dial 134. Pointer 132 is coupled to shaft 122 to rotate when the shaft rotates. Dial 134, which is one example of an indicia plate, is positioned relative to pointer 132 such that rotation of shaft 122 positions pointer 132 opposite temperature indicating indicia on the face of dial 134. This provides a visible indication of temperature at device 100.

Movement-indicative signal generator 140 includes an inductive target 142 and a printed circuit board (PCB) 144. Inductive target 142 is coupled to shaft 122 to rotate with the shaft. In particular implementations, target 142 is a lightweight, metallic (e.g., stainless steel or aluminum) member rigidly attached (e.g., by welding) to shaft 122.

PCB 144 is fixed in position relative to shaft 122, behind dial 134. PCB 144 may be coupled to assembly 110 to minimize case strains, which may affect signal level. PCB 144 may be coupled to assembly 110 by press fit, adhesive, or other appropriate technique.

PCB 144 includes an aperture 146 through which housing 112, and, hence, shaft 122, pass. PCB 144 also includes inductors 148, which may, for example, be inductive coils, positioned to electrically respond to the movement of inductive target 142, target 142 and inductors 148 forming an inductive assembly. In particular implementations, inductors 148 may be cooperating inductive coil elements. These elements may be discrete or printed directly onto PCB 144. Target 142 and inductors 148, along with an impressed current from the PCB, generate a change in an eddy current pattern in response to the movement of target 142. Eddy current patterns may be unique for every for each position corresponding to a different temperature value being sensed. PCB 144 additionally includes detecting circuitry 150 to detect the eddy current patterns and a processor 152 to track the movement of the target, and, hence, the shaft, and to determine the sensed temperature based on the movement. Suitable eddy current detecting circuitry is available from LZT Technology of San Bernadino, Calif. Processor 152 may, for example, be a microprocessor.

In FIG. 1B, it can be seen that target 142 is in close proximity to PCB 144. In this implementation, the distance between target 142 and PCB 144 is approximately 0.025 inches. In other implementations, however, target 142 does not have to be in close proximity to PCB 144. In general, target 142 may be at any distance as long as it can inductively interact with inductors 148.

As target 142 begins to rotate in response to rotation of shaft 122, the rotation of target 142 relative to PCB 144 causes the eddy current pattern generated by a predetermined web of target 142 and a facing coil element instance to change. Processor 152 accumulates these changes, which are analogous to temperature. To accumulate the rotations, the processor may understand where the target starts relative to the target position and count notches (i.e., pulses) up and down scale. The required resolution of the output signal determines the number of web/space pairs required in the target.

Coupled to PCB 144 are a pair of wires 158. Wires provide loop power to the electronic components of PCB 144, such as processor 152. In other implementations, PCB 144 may be externally powered.

The temperature measurement device illustrated by FIG. 1 may have a variety of features. For example, the device may allow a relatively small inductive target 142 to be used for signal generator 140. For instance, the target may have a mass moment of inertia on the order of $3.5 \times 10^{-5}$ in-lb, which may, for example, be achieved with a 0.800 inch diameter×0.007 inch thick aluminum disc with fifty percent gutting. Having a relatively small inductive target may be important because, in many implementations, the mechanical power generated by assembly 110 is small. Thus, the temperature may be measured without significantly interfering with the mechanical operation of assembly 110. As another example, target 142 may allow inductive current generation across a wide angular range (e.g., three-hundred degrees). This may be important for implementations where pointer 132 has a wide angular range. As a further example, the signal generator may be used without the visual indicator assembly. Thus, blind temperature measurement devices are feasible. As an additional example, the device may be readily manufactured.

Temperature measurement device 100 may have a variety of uses. For example, it may be used as a temperature monitoring and reporting device. However, it may also be incorporated into other devices that require temperature measurements. For example, device 100 may be incorporated into a temperature correction device adapted to be self-contained in a conventional fluid meter of the fixed or constant displacement type.

In particular implementations, a temperature measurement device may have less, more, and/or a different arrangement of components than device 100. For example, assembly 110 may include a low-friction bearing arrangement that supports rotatable shaft 122. In this arrangement, guide 124 may secure shaft 122 in the bearing. Alternatively, a bushing could be used. As a further example, shaft 122 may be driven by a temperature responsive element other than a bimetallic coil. For instance, the shaft may be driven by a gas-filled Bourdon tube connected to a line and remote-sensing bulb assembly. As an additional example, the inductive target may be directly attached to pointer 132. As another example, a digital indicator may be used in place of the illustrated analog indicator. In other implementations, though, a visual indicator may not be used. As a further example, shaft 122 may drive PCB. 144 rather than inductive target 142. As another example, PCB 144 may include a wireless transmitter to send temperature data to a remote station. The transmitter could send data using radio frequency (RF), infrared (IR), or any other appropriate technique. Structure may also be provided in PCB 144 to adjust offset and gain of the signal in known fashion.

FIG. 2 illustrates an example inductive target 200. Target 200 has a hub 210 from which a series of webs 220 radially project. Between webs 220 are spaces 230, such that webs 220 and spaces 230 alternate. The total number of webs 220 and spaces 230 is related to the required rotation of a driving shaft.

In operation, a driving shaft causes target 200 to move relative to inductors on a PCB, which causes the eddy current pattern between a web and facing coil element instance to change. Thus, each web/space pair produces a pulse under shaft rotation, assuming they are opposite a coil element. A processor accumulates these pulses and, thus, can determine the position of the driving shaft. The processor may accumulate these rotations, which are analogous to temperature.

Figure 3:
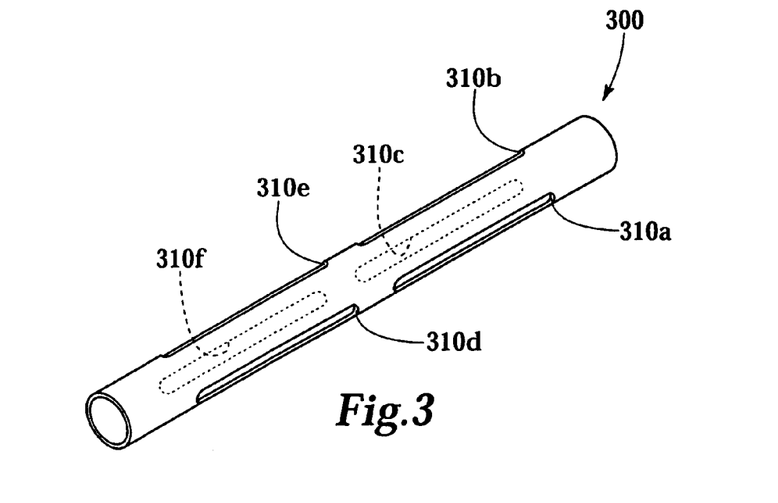
FIG. 3 shows a perspective view of a sheath for protecting a temperature-responsive element.

FIG. 3 illustrates a sheath 300 for protecting a temperature-responsive element such as a bimetallic coil against injury and improving performance. Sheath 300 is formed in a tubular configuration for connection to a tubular connector flange of a temperature-responsive assembly, and includes a plurality of a parallel, elongated slots 310 through which fluid (i.e., liquid, gas, or a combination thereof) may flow in contact with a temperature-responsive element. In some implementations, sheath 300 is removable, which could make it useful for applications where aperture size varies.

Figure 4:
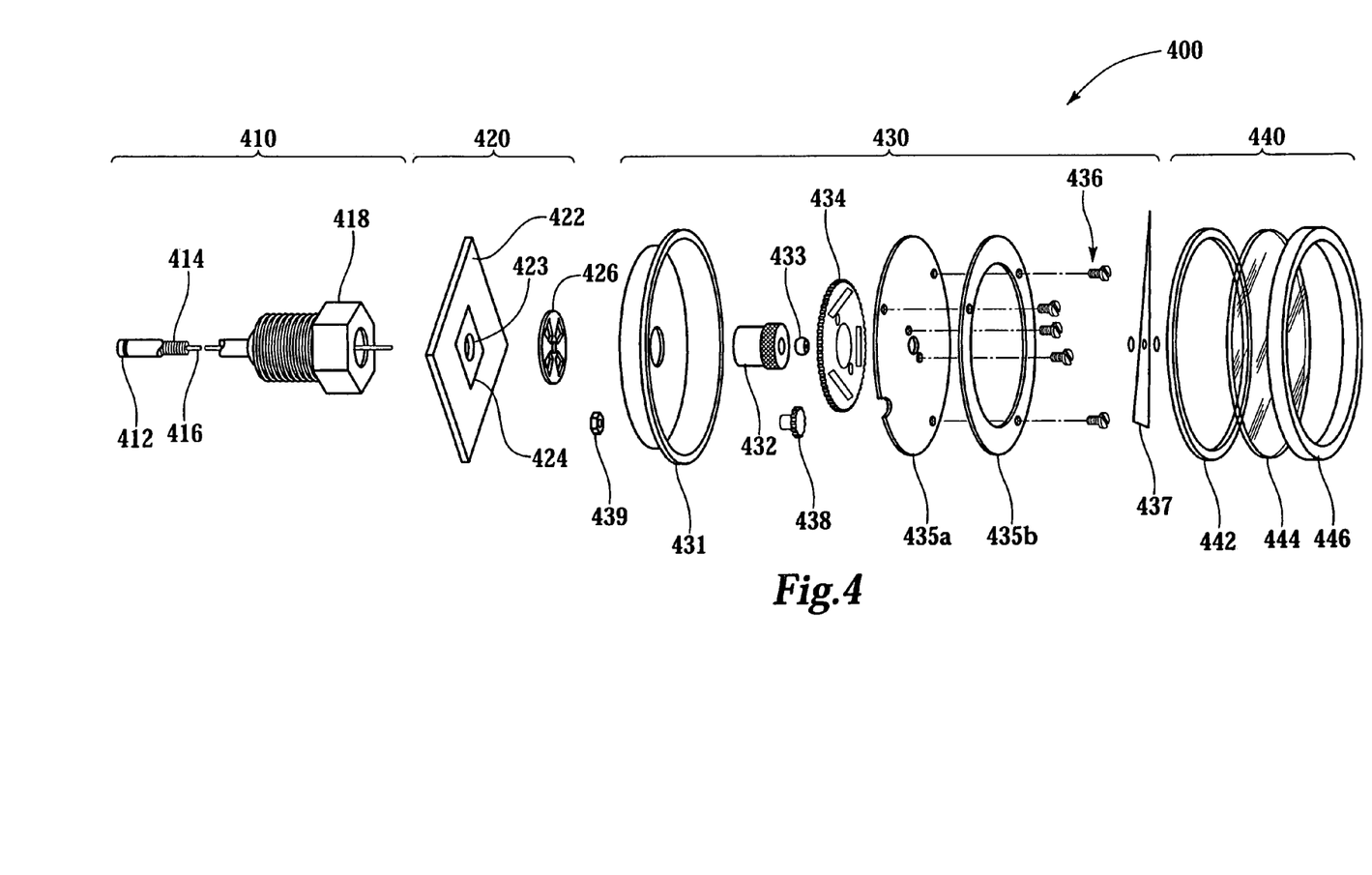
FIG. 4 shows a perspective view of another example temperature measurement device.

FIG. 4 illustrates an example temperature measurement device 400. Device 400 includes a temperature-responsive assembly 410, an inductive assembly 420, a visual indicator assembly 430, and a sealing assembly 440. In operation, temperature-responsive assembly 410 produces mechanical motion in response to temperature changes. The mechanical motion drives: 1) inductive assembly 420 such that it produces an electrical signal corresponding to the sensed temperate; and 2) visual indicator assembly 430 such that it produces a visual indication of the sensed temperature. Sealing assembly 440 protects visual indicator assembly 430.

In more detail, temperature-responsive assembly 410 includes a stem 412, a coil 414, a shaft 416, and a process connection 418. Stem 412 interfaces with the fluid for which the temperature is to be sensed. Located inside stem 412 are coil 414, which may, for example, be a bimetallic, spiral-wound coil, and shaft 416. Stem 412 may or may not sealingly protect coil 414 and shaft 416. Coil 414 is coupled to shaft 416 and rotates in response to temperature changes. The rotation of coil 414 causes shaft 416 to rotate. Shaft 416 passes through process connection 418 for interaction with other parts of device 400; Process connection 418 provides a coupling between the fluid process to be measured (e.g., fluid in a pipe) and device 400 so that device 400 is not dislodged due to the movement and/or pressure of the fluid being measured.

Inductive assembly 420 includes a PCB 422 and an inductive target 426. PCB 422 includes an aperture 423 through which shaft 416 passes and inductive coils 424 around aperture 423. PCB 422 is fixed in position relative to the shaft. Inductive target 426, on the other hand, is coupled to the shaft such that it rotates therewith. Thus, when shaft 416 rotates, target 426 rotates relative to PCB 422. This rotation interrupts inductive coils 424, which generates an electrical signal representative of the shaft movement, and, hence, corresponding to the temperature, as discussed previously.

Visual indicator assembly 430 includes a housing 431 to protect the movable components of the assembly. Assembly 430 also includes a bushing 432 that captures shaft 416 and a bearing 433 that couples to the end of the shaft to allow it to rotate. Assembly 430 additionally includes a gear 434 coupled to bushing 432 and a dial 435 coupled to the gear by screws 436. Dial 435 includes a dial face 435a and a dial ring 435b. Pressure demarcations may be on face 435a and/or ring 435b. Coupled to bushing 433 is a pointer 437. Pointer 437 rotates with shaft 416 to visually indicate the temperature. Assembly 430 additionally includes a pinion 438 and an adjuster 439. Pinion interfaces with gear 434 so that dial 435 may be adjusted by the manipulation of adjuster 439.

Sealing assembly 440 protects components of visual indicator assembly 430. Sealing assembly 440 includes a gasket 442, a window 444, and a ring 446. To seal assembly 430, gasket 442 is compressed between housing 431 and window 444. The compression is maintained by mating ring 446 with housing 431. In particular implementations, sealing assembly 440 may hermetically seal the visual indicator assembly components inside housing 431.

Figure 5A:
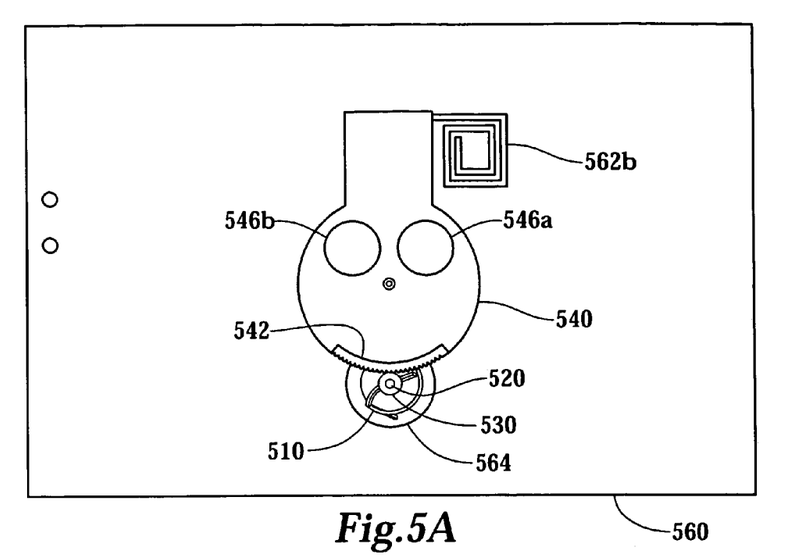
FIGS. 5A-B illustrate another example temperature measurement device.
Figure 5B:
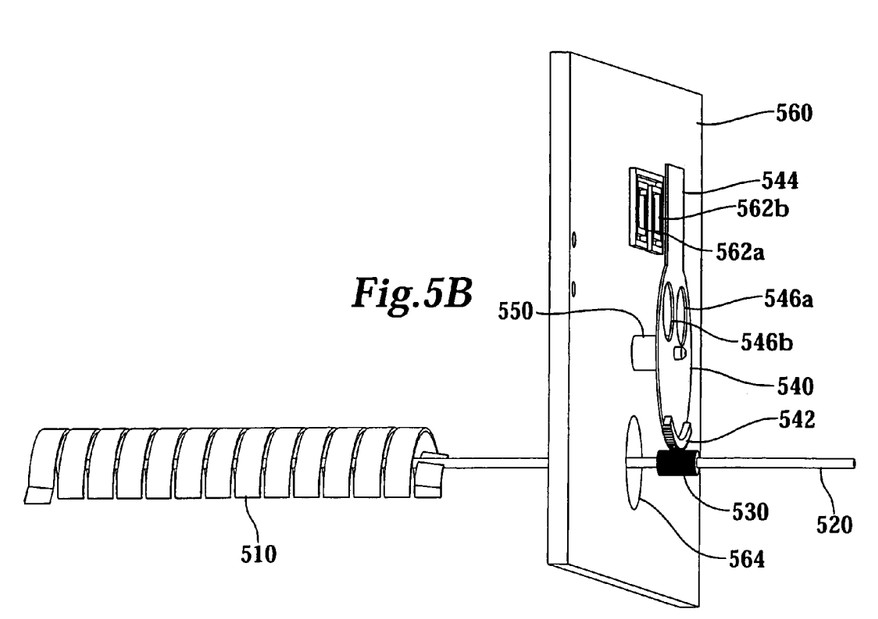

FIGS. 5A-B illustrate an example temperature measurement device 500. FIG. 5A shows a top view of temperature measurement device 500, and FIG. 5B shows a perspective-view temperature measurement device 500.

Device 500 includes a temperature responsive coil 510 that drives a shaft 520. Coupled to shaft 520 is a driving gear 530. Driving gear 530 may be made of any suitable material (e.g., metal or plastic) and may be relatively small and lightweight. Device 500 also includes a driven gear 540. In general, driven gear 540 has a pitch radius that is larger than that of driving gear 530. In the illustrated implementation, for instance, the pitch radius of driven gear 540 is approximately fifteen times larger than that of driving gear 530, resulting in a gear ratio of approximately 15:1. Driven gear 540 is supported by a pillar 550. Pillar 550 is firmly affixed to a printed circuit board 560, which has inductive coils 562 printed directly thereon. PCB 560 also includes an aperture 564 through which shaft 520 passes. PCB 560 may be rigidly attached to a tube such as tube 112 in FIG. 1A and/or otherwise isolated from external case strains.

Driven gear 540 includes a tooth section 542 that meshes with driving gear 530. Driven gear 540 also includes a protuberance 544 that acts as an inductive target for an inductive assembly. If driven gear 540 is made of plastic then at least one face of protuberance 544 should be overlaid with a layer of sheet metal (e.g., aluminum) to act as a target cooperatively functioning with coils 562 to control the eddy current patterns. Driven gear 540 further includes apertures 546 to reduce the gear's mass moment of inertia, which allows coil 510 to exert less torque to move shaft 520.

Using driving gear 530 and driven gear 540 serves to reduce the rotation of the inductive target (i.e., protuberance 544) to a relatively small value. For example, in the illustrated implementation, the rotation is reduced to approximately 18 degrees when the required pointer rotation is 270 degrees. Another feature is that the motion of the target is almost linear in nature. This means that the electronic circuitry may only have to handle a single, "lengthened" pulse; thus, the circuitry may not have to count pulses. Hence, this implementation may or may not need a processor in the circuit design.

Figure 6:
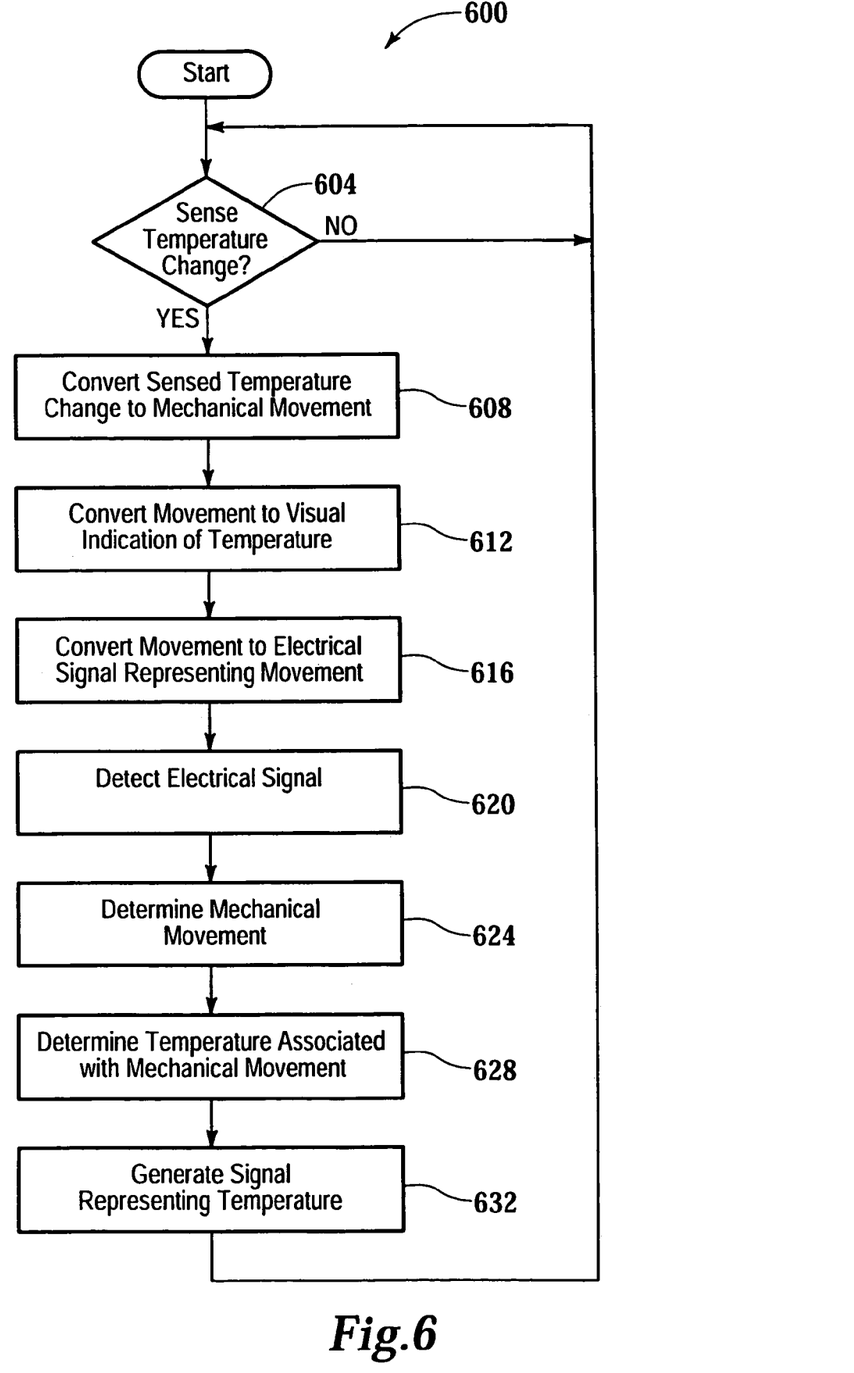
FIG. 6 is a flow chart illustrating a process at a temperature measure device.

FIG. 6 illustrates a process 600 at a temperature measurement device. Process 600 may be implemented by a temperature measurement device similar to device 100 in FIG. 1.

The process begins with waiting to sense a temperature change (decision block 604). Temperature may be sensed, for example, by a bimetallic coil or a gas-filled Bourdon tube. Once a temperature change is sensed, the process continues with converting the sensed temperature change to mechanical movement (function block 608). The temperature may, for example, be converted to mechanical movement by a spiral wound, bimetallic coil that causes a shaft to rotate.

The process also calls for converting the mechanical movement to a visual indication of temperature (function block 612). The conversion may, for example, be accomplished by a pointer coupled to a rotatable shaft and having an accompanying dial.

The process additionally calls for converting the movement to an electrical signal representing the movement (function block 616). This may, for example, be accomplished by an inductive target driven by the mechanical movement and inductive coils positioned to electrically respond to the target, where eddy current patterns change to as the inductive target moves.

After the electrical signal has been generated, the process calls for detecting the electrical signal (function block 620) and determining the mechanical movement based on the electrical signal (function block 624). Determining the mechanical movement may include determining the direction and magnitude of the movement and may be accomplished by comparing the electrical signal to previously received electrical signals to determine a change in amplitude levels.

The process also calls for determining a temperature associated with the mechanical movement (function block 628). This may, for example, be accomplished by an using an algorithmic association of position and temperature, by consulting a table containing mechanical position and temperature associations, or by any other appropriate technique. The process additionally calls for generating a signal representing the temperature (function block 632). The signal may be in analog or digital format and may be transmitted using wireline or wireless techniques. If in analog form, the signal may be between 4-20 mA. The process then calls for again waiting to sense a temperature change.

Although FIG. 6 illustrates a process at a temperature measurement device, other processes at a temperature measurement device may contain less, more, and/or a different arrangement of operations. For example, certain processes may not call for converting the mechanical movement to a visual indication. As another example, the conversion of mechanical movement to a visual indication and the conversion of mechanical movement to an electrical signal may be accomplished simultaneously. As a further example, the operations expressed by functions blocks 620-632 may be eliminated. As an additional example, some processes may have operations that depend on the determined temperature. For instance, temperature check rates and exception reporting may be adjusted based on the determined temperature. Furthermore, communication rates regarding the sensed temperature may be adjusted based on the determined temperature. For example, as determined temperature rises or falls below a threshold, communication rates regarding the determined temperature may be increased and/or decreased.

While particular implementations and applications have been illustrated and described, it is to be understood that the invention is not limited to the precise construction and compositions disclosed herein and that various additions, deletions, substitutions, and/or modifications will be apparent from the foregoing descriptions without departing from the spirit and scope of the invention as defined in the appended claims.

What is claimed is:

1. A device responsive to temperature change, the device comprising:
   a temperature-responsive element operable to sense temperature and move in response to temperature changes;
   a first inductive component displaceable by the movement of the temperature-responsive element; and
   a second inductive component positioned relative to the first inductive component, such that movement of the first inductive component generates a change in a local eddy current pattern corresponding to a temperature change.

2. The device of claim 1, further comprising a circuit operable to sense the local eddy current pattern, wherein a current at a particular point in the sensing circuit is proportional to the temperature change causing the temperature-responsive element to move.

3. The device of claim 1, further comprising a circuit board comprising the second inductive component.

4. The device of claim 1, further comprising a processor responsive to changes in eddy current patterns to generate a signal representative of sensed temperature.

5. The device of claim 4, wherein the processor determines the movement of the temperature-responsive element based on the changes in eddy current patterns and associates the movement with a temperature to generate the signal.

6. The device of claim 1, wherein the temperature-responsive element comprises a first portion and a second portion displaceable relative to the first portion, wherein the second portion drives the first inductive component.

7. The device of claim 6, further comprising a visual indicator driven by the second portion of the temperature-responsive element to indicate temperature.

8. The device of claim 1, wherein the first inductive component comprises a gear with a pitch ratio larger than that of the temperature-responsive element.

9. The device of claim 8, wherein the gear comprises a protuberance that operates as an inductive target.

10. The device of claim 8, wherein the pitch ratio of the gear is approximately fifteen times larger than that of the temperature responsive element.

11. The device of claim 1, wherein:
    the temperature-responsive element comprises:
    a coil operable to displace in response to changes in temperature of a medium for which a temperature is to be sensed; and
    a rotatable shaft driven by the temperature-responsive coil;
    the first inductive component comprises an inductive target displaceable by the rotatable shaft; and
    the second inductive component comprises an inductor positioned relative to the inductive target such that displacement of the inductive target by the rotatable shaft generates a change in a local eddy current pattern corresponding to a temperature change.

12. The device of claim 11, wherein the inductive target is rotatable with the rotatable shaft.

13. The device of claim 11, further comprising a circuit board comprising an opening through which the rotatable shaft extends, wherein the circuit board comprises the inductor.

14. The device of claim 13, wherein the inductive target rotates in a plane generally parallel to the circuit board.

15. The device of claim 13, further comprising:
    a pointer coupled to the rotatable shaft; and
    an indicia plate fixed relative to the pointer such that the pointer rotates in a plane generally parallel to the indicia plate to indicate temperature.

16. The device of claim 15, wherein the inductive target is positioned between the indicia plate and the circuit board.

17. The device of claim 11, wherein the inductive target comprises a plurality of radial features extending transversely relative to a longitudinal axis of the rotatable shaft.

* * * * *